United States Patent
Wong

(10) Patent No.: US 9,609,093 B2
(45) Date of Patent: Mar. 28, 2017

(54) PROTECTIVE SHELL FOR ELECTRONIC EQUIPMENT

(71) Applicant: Chih-Juh Wong, New Taipei (TW)

(72) Inventor: Chih-Juh Wong, New Taipei (TW)

( * ) Notice: Subject to any disclaimer, the term of this patent is extended or adjusted under 35 U.S.C. 154(b) by 0 days.

(21) Appl. No.: 14/455,959

(22) Filed: Aug. 11, 2014

(65) Prior Publication Data

US 2017/0054833 A1  Feb. 23, 2017

(51) Int. Cl.
*H04M 1/00* (2006.01)
*H04M 1/02* (2006.01)
*H04B 1/3888* (2015.01)

(52) U.S. Cl.
CPC ........ *H04M 1/0202* (2013.01); *H04B 1/3888* (2013.01)

(58) Field of Classification Search
CPC ............................ H04M 1/0202; H04B 1/3888
USPC ........................ 455/575.8, 556.1, 575.1, 41.1
See application file for complete search history.

(56) References Cited

U.S. PATENT DOCUMENTS

| 8,995,126 B2 * | 3/2015 | Rayner | 361/679.56 |
| 2014/0262847 A1 * | 9/2014 | Yang | 206/37 |
| 2015/0061477 A1 * | 3/2015 | Wilson | 312/223.1 |

* cited by examiner

*Primary Examiner* — Dhaval Patel

(57) ABSTRACT

A protective shell for electronic equipment contains: a first casing and a second casing which are connected together to form an accommodating cavity for accommodating electronic equipment. The first casing has a first bottom plate, the second casing has a second bottom plate, a first end of the first bottom plate retains with a first end of the second bottom plate, and the first bottom plate has a protective fence arranged around a second end and two peripheral sides thereof, the second bottom plate has a protective fence formed around a second end and two peripheral sides thereof. Each protective fence of the first bottom plate and the second bottom plate has a curved retaining portion defined on a free end thereof. Thereby, the protective shell dissipates heat to air quickly so as to cool the electronic equipment efficiently.

16 Claims, 8 Drawing Sheets

136

1361

1362

1363

PROTECTIVE SHELL FOR ELECTRONIC EQUIPMENT

FIELD OF THE INVENTION

The present invention relates to a protective shell for electronic equipment which dissipates heat quickly and positions the electronic equipment securely.

BACKGROUND OF THE INVENTION

Conventional handheld electronic devices contain a mobile phone, PDA, handheld game consoles and tablet PCs, etc.

To protect the handheld electronic devices, a protective shell for electronic equipment has been developed. However, such a protective shell cannot dissipate heat and position the electronic equipment effectively.

The present invention has arisen to mitigate and/or obviate the afore-described disadvantages.

SUMMARY OF THE INVENTION

The primary object of the present invention is to provide a protective shell for electronic equipment which dissipates heat quickly and positions the electronic equipment securely.

To obtain the above objective, protective shell for electronic equipment provided by the present invention contains: a first casing and a second casing which are connected together to form an accommodating cavity for accommodating electronic equipment, wherein the first casing or the second casing is flexible to place electronic equipment in the accommodating cavity or to remove the electronic equipment from the accommodating cavity.

The first casing has a first bottom plate, the second casing has a second bottom plate, a first end of the first bottom plate retains with a first end of the second bottom plate, and the first bottom plate has a protective fence arranged around a second end and two peripheral sides thereof, the second bottom plate has a protective fence formed around a second end and two peripheral sides thereof, wherein each protective fence of the first bottom plate and the second bottom plate has a curved retaining portion defined on a free end thereof, such that the first bottom plate, the second bottom plate, two protective fences of the first bottom plate and the second bottom plate, and two retaining portions of the first bottom plate and the second bottom plate form the accommodating cavity.

The protective shell for the electronic equipment further contains a third bottom plate corresponding to the second bottom plate, wherein the third bottom plate 13 is arranged on a back surface of the second bottom plate and retains with the first bottom plate, such that the first end of the first bottom plate is defined between the second bottom plate and the third bottom plate.

DETAILED DESCRIPTION OF THE PREFERRED EMBODIMENTS

Figure 1:
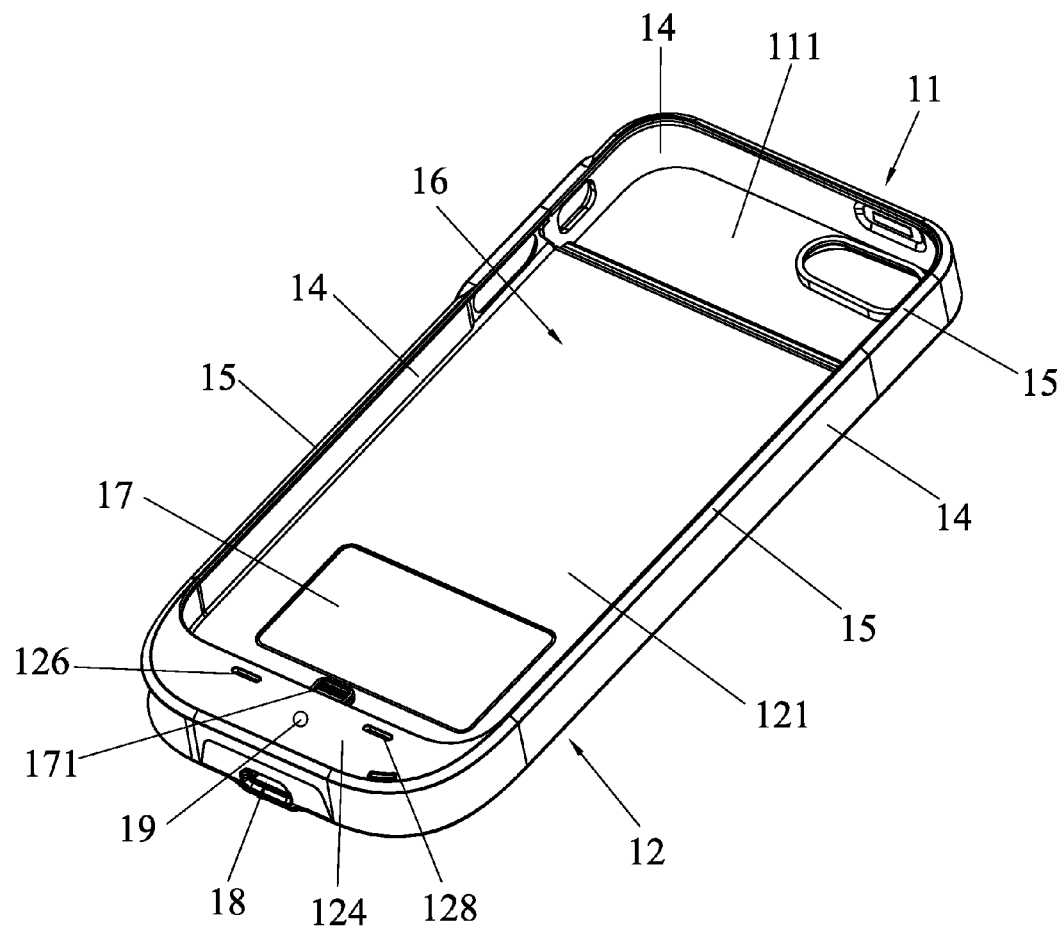
FIG. 1 is a perspective view of the assembly of a protective shell for electronic equipment according to a preferred embodiment of the present invention.

FIGS. 1-5, a protective shell 1 for electronic equipment according to a preferred embodiment of the present invention comprises: a first casing 11 and a second casing 12 which are connected together to form an accommodating cavity 16 for accommodating the electronic equipment, wherein the first casing 11 or the second casing 12 is flexible to place the electronic equipment in the accommodating cavity 16 or to remove the electronic equipment from the accommodating cavity 16 easily. In addition, the electronic equipment is mounted in the accommodating cavity 16 securely.

The first casing 11 has two peripheral sides shorter than two peripheral sides of the second casing 12.

The first casing 11 has a first bottom plate 111, the second casing 12 has a second bottom plate 121, a first end of the first bottom plate 111 retains with a first end of the second bottom plate 121, and the first bottom plate 111 has a protective fence 14 arranged around a second end and two peripheral sides thereof, the second bottom plate 121 has a protective fence 14 formed around a second end and two peripheral sides thereof, wherein each protective fence 14 of the first bottom plate 111 and the second bottom plate 121 has a curved retaining portion 15 defined on a free end thereof, such that the first bottom plate 111, the second bottom plate 121, two protective fences 14 of the first bottom plate 111 and the second bottom plate 121, and two retaining portions 15 of the first bottom plate 111 and the second bottom plate 121 form the accommodating cavity 16, wherein the two retaining portions 15 retain with the electronic equipment.

The second end of the second casing 12 has a panel 124 defined thereon and a receiving space formed below the panel 124 to receive an indicating unit.

The protective shell 1 also comprises a third bottom plate 13 corresponding to the second bottom plate 121, wherein a size of the third bottom plate 13 is equal to that of the second bottom plate 121, and the third bottom plate 13 is arranged on a back surface of the second bottom plate 121 and retains with the first bottom plate 111, such that the first end of the first bottom plate 111 is defined between the second bottom plate 121 and the third bottom plate 13 so that the first casing 11 is pressed to bend flexibly.

Referring to FIGS. 1-4, the first bottom plate 111 also has a locking rib 112 extending outwardly from the first end thereof and has at least one orifice 113 defined on the locking rib 112, the second bottom plate 121 and the third bottom plate 13 have plural retaining protrusions for retaining with the at least one orifice 113, such that the locking rib 112 is retained between the second bottom plate 121 and the third bottom plate 13, thus fixing the first bottom plate 111.

In details, the second bottom plate 121 has plural first retaining protrusions 122 and plural second retaining protrusions 123 arranged thereon and corresponding to the at least one orifice 113, wherein each first retaining protrusion 122 is spaced apart from each second retaining protrusion 123. Furthermore, the third bottom plate 13 has a plurality of third retaining protrusions 131 formed thereon and corresponding to the at least one orifice 113, wherein each third retaining protrusion 131 is in a triangle shape, and a thickness of a bottom of each third retaining protrusion 131 is equal to a distance between each first retaining protrusion 122 and each second retaining protrusion 123, such that each first retaining protrusion 122, each second retaining protrusion 123, and each third retaining protrusion 131 are retained in each orifice 113, and each third retaining protrusion 131 is retained between each first retaining protrusion 122 and each second retaining protrusion 123, thus fixing the first bottom plate 111. Also, the second bottom plate 121 can have a combined retaining protrusion to replace each second retaining protrusion and each third retaining protrusion.

As shown in FIGS. 1 to 4, the protective shell 1 is employed to accommodate a wired charging device or a wireless charging device.

Figure 2:
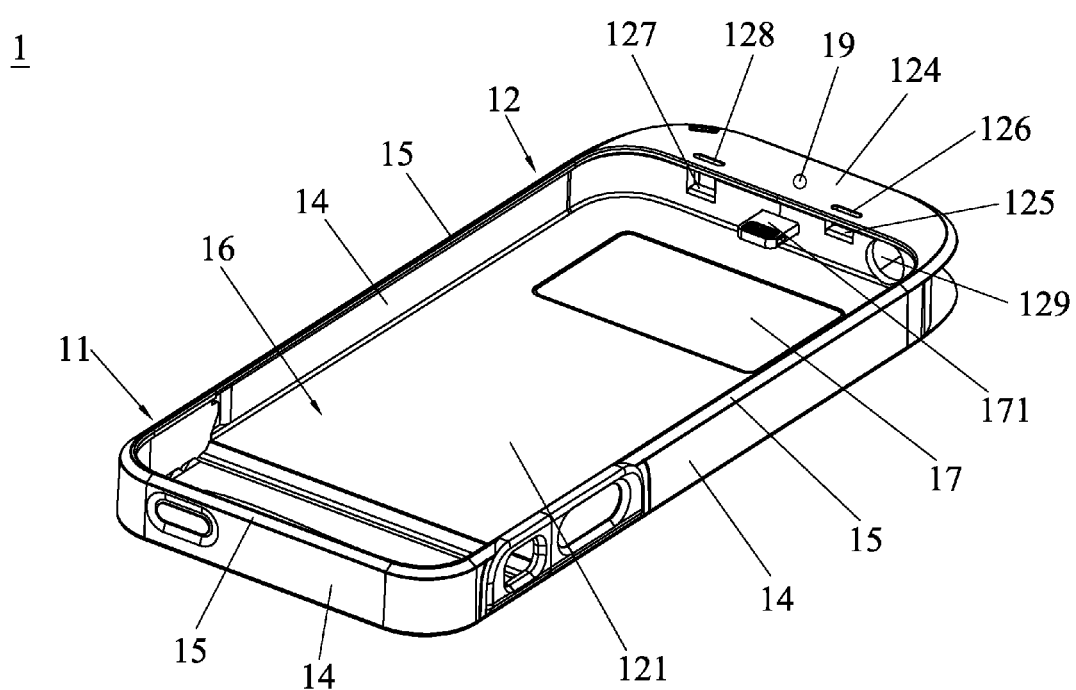
FIG. 2 is another perspective view of the assembly of the protective shell for the electronic equipment according to the preferred embodiment of the present invention.
Figure 3:
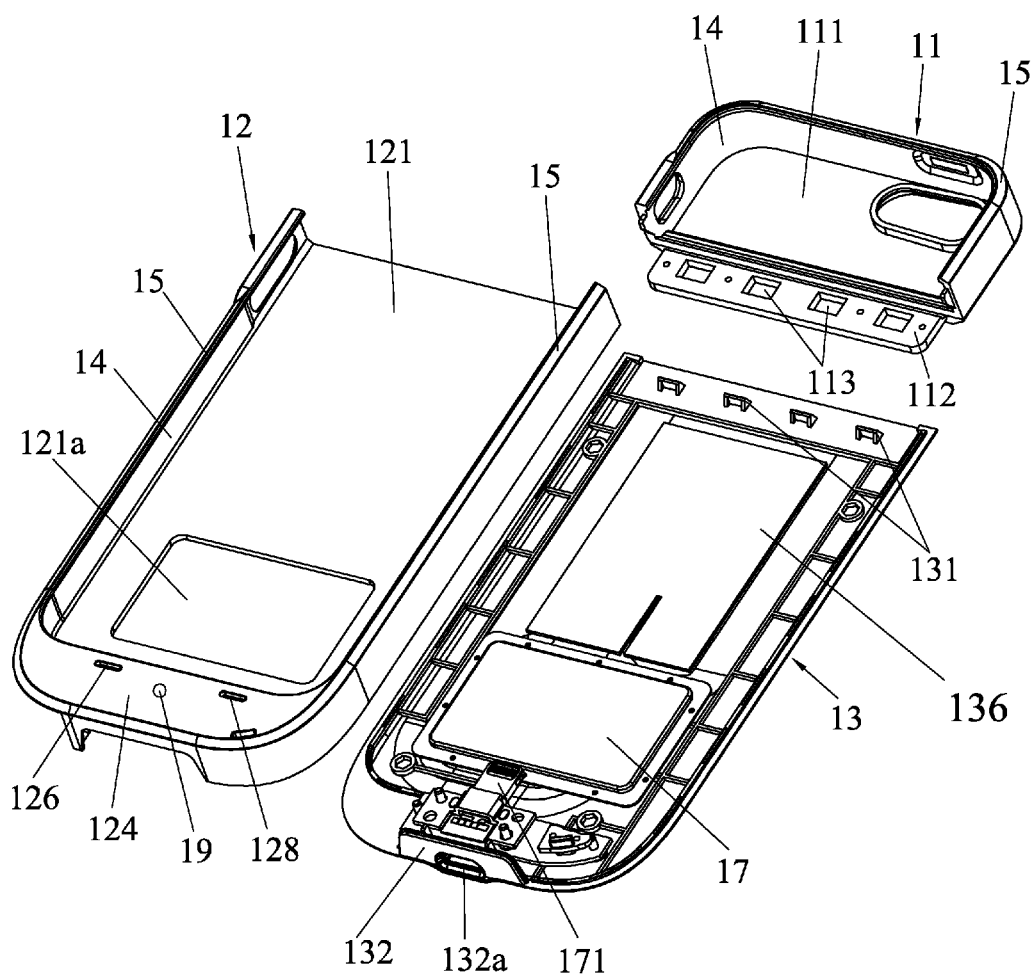
FIG. 3 is a perspective view of the exploded components of the protective shell for the electronic equipment according to the preferred embodiment of the present invention.
Figure 4:
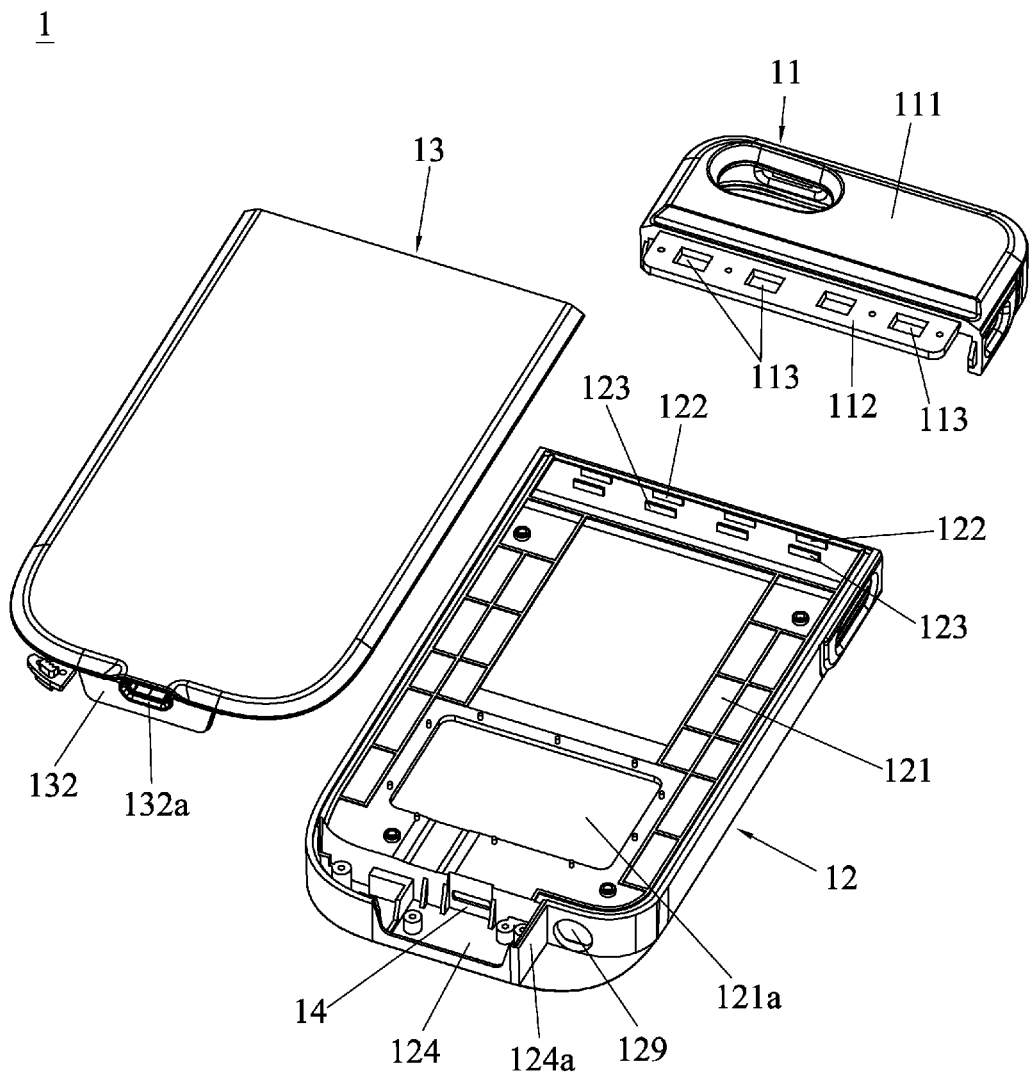
FIG. 4 is another perspective view of the exploded components of the protective shell for the electronic equipment according to the preferred embodiment of the present invention.
Figure 5:
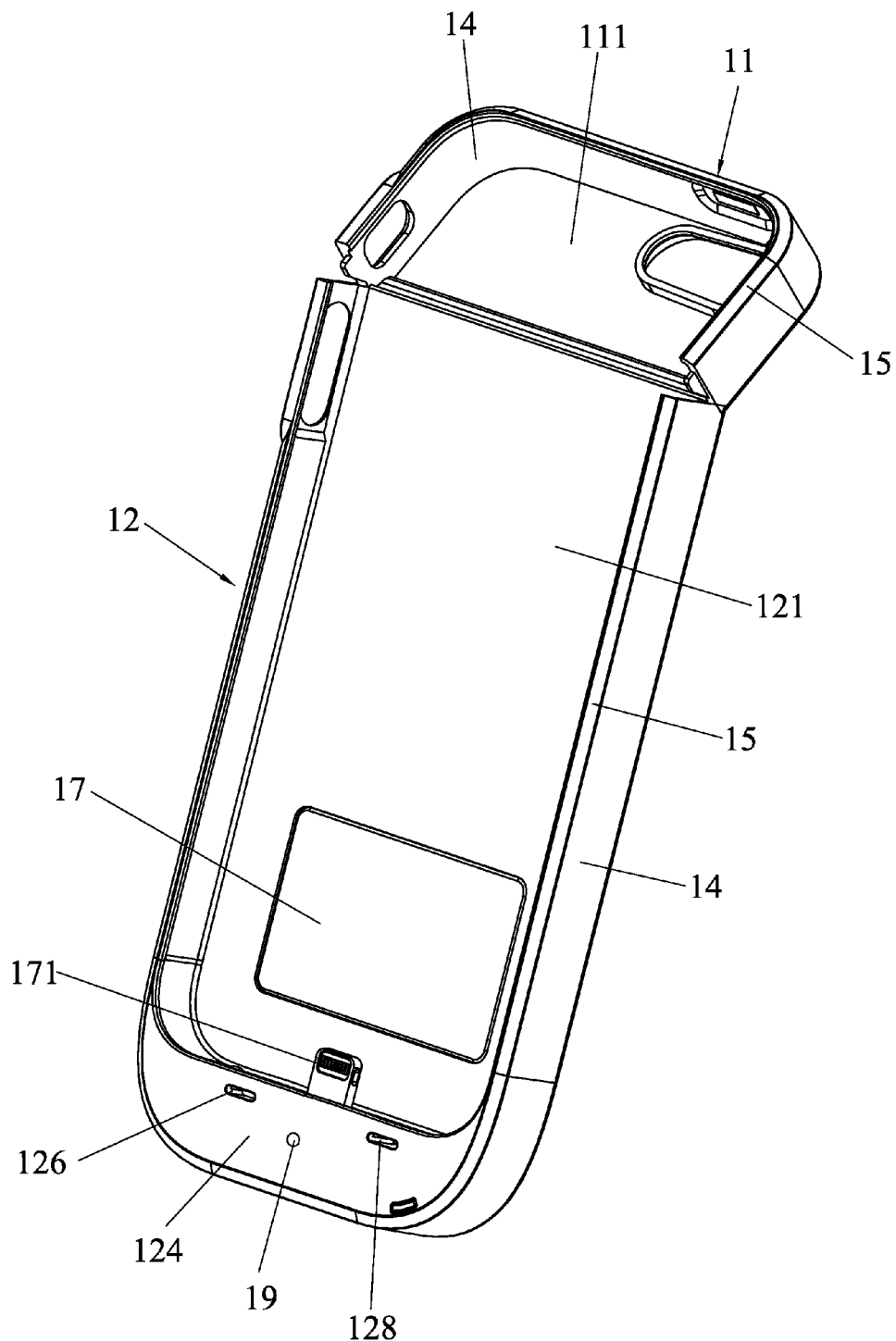
FIG. 5 is a perspective view of the operation of the protective shell for the electronic equipment according to the preferred embodiment of the present invention.

For example, the protective shell 1 further comprises a wireless charging circuit board 17 defined between the second bottom plate 121 and the third bottom plate 13. In this embodiment, the second bottom plate 121 has a through hole 121a defined thereon to extend the wireless charging circuit board 17 outwardly and to expose the wireless charging circuit board 17 outside the accommodating cavity 16 (as shown in FIGS. 1 and 2). The wireless charging circuit board 17 has an output segment 171 arranged on the protective fence 14 of the third bottom plate 13 to correspond to a charging interface of the electronic equipment and extending into the accommodating cavity 16, such that when the electronic equipment is accommodated in the accommodating cavity 16, the output segment 171 electrically connects with the charging interface of the electronic equipment, the wireless charging circuit board 17 receives a signal from an external sending end, and power is charged to the electronic equipment via the output segment 171.

For example, when the charging interface of the electronic equipment corresponds to the panel 124, a first end of the output segment 171 is located below the panel 124, and a second end of the output segment 171 extends into the accommodating cavity 16. The panel 124 has a side fringe 124a vertical thereto, the third bottom plate 13 has a stop piece 132 disposed on an end portion thereof, and after the third bottom plate 13 and the second bottom plate 121 are connected together, the receiving space is defined by the protective fence 14 of the second bottom plate 121, the panel 124, the side fringe 124a, and the stop piece 132, such that the first end of the output segment 171 is received in the receiving space, and the second end of the output segment 171 extends into the accommodating cavity 16.

The receiving space has an input interface 18 arranged therein and electrically connected with the output segment 171, the stop piece 132 has an aperture 132a defined thereon and corresponding to the input interface 18. Preferably, the input interface 18 is a USB interface for electrically connecting with an external USB data cable, thus sending data to the electronic equipment.

As illustrated in FIGS. 1 to 4, the protective shell 1 further comprises the indicating unit for indicating a connecting state of the electronic equipment and the external USB data cable or indicating a charging state of the electronic equipment.

The indicating unit includes a circuit board (not shown) and at least one indicator 19 coupled with the circuit board and arranged on/in the panel 124, wherein the circuit board is mounted in the receiving space, the indicator 19 exposes outside the panel 124 or is arranged in the panel 124, and the panel 124 has a transparent window formed thereon to correspond to the indicator 19. The circuit board is connected with the output segment 171 and the input interface 18 to compare voltage or current by using a detection circuit on the circuit board, such that the indicator 19 illuminates or displays different colors of lights at various frequencies to indicate the connecting state of the electronic equipment and the external USB data cable or the charging state of the electronic equipment. For instance, when the electronic equipment and the external USD data cable are connected together, the indicator 19 illuminates; and when the electronic equipment is in the charging state, the indicator displays a red light, and when a charging process is finished, the indicator 19 displays a green light.

Preferably, the indicator 19 is an indication light or a LCD monitor.

The protective fence 14 of the second bottom plate 121 has a socket corresponding to a docking port of the electronic equipment, and the docking port is applied to connect with an external part or is an operation button on the electronic equipment, for example, the docket port is arranged on an earphone of the electronic equipment, each protective fence 14 of the second bottom plate 121 has a connecting orifice 129 for connecting with the earphone.

Figure 6:
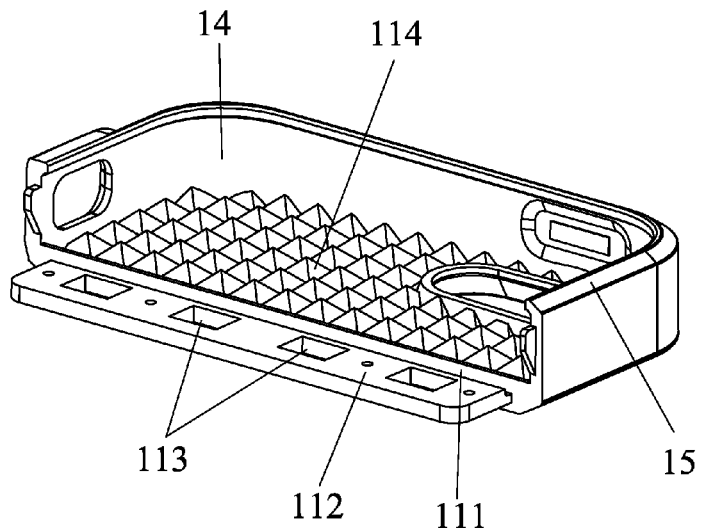
FIG. 6 is a perspective view of the assembly of a first casing of a protective shell for electronic equipment according to another preferred embodiment of the present invention.

With reference to FIG. 6, the first bottom plate 111 has three-dimensional patterns 114 formed on an upper surface thereof in the accommodating cavity 16, such that the protective shell 1 dissipates heat quickly and positions the electronic equipment securely.

Figure 7:
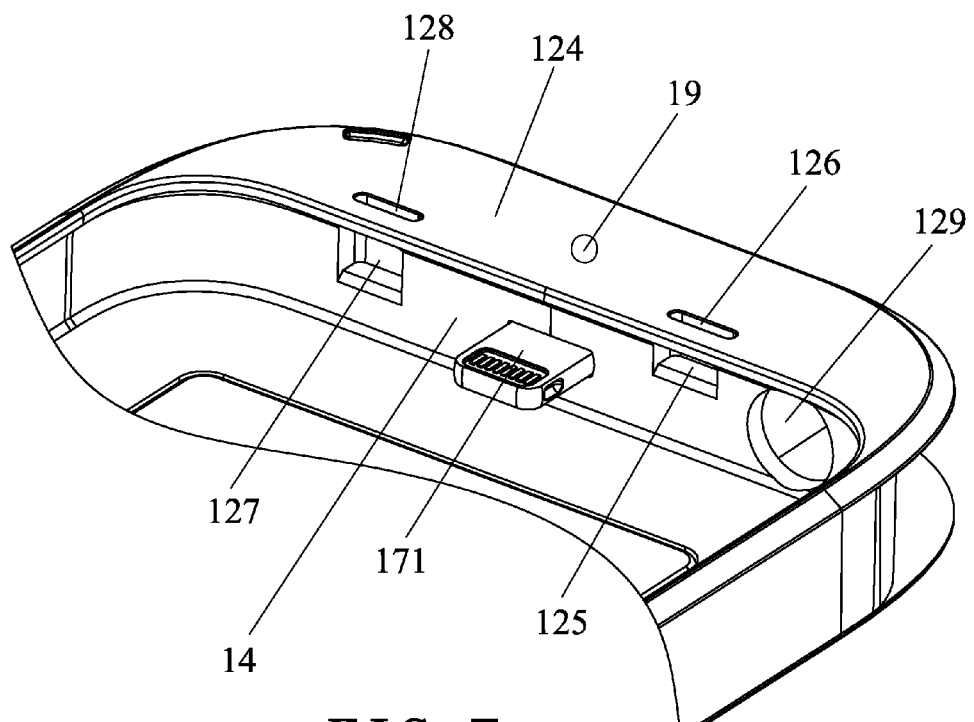
FIG. 7 is an amplified perspective view of a part of FIG. 2.

Referring to FIG. 7, the protective fence 14 of the second bottom plate 121 has a first recess 125 defined thereon to correspond to a speaker of the electronic equipment, and the curved retaining portion 15 of the second bottom plate 121 has at least one sound sending orifice 126 formed thereon to correspond to the first recess 125; the protective fence 14 of the second bottom plate 121 further has a second recess 127 arranged thereon to correspond to a microphone of the electronic equipment, and the curved retaining portion 15 of the second bottom plate 121 further has at least one sound receiving orifice 128 defined thereon to correspond to the second recess 127. In this embodiment, a number of the at least one sound sending orifice 126 and the at least one sound sending orifice is one.

When the speaker and the microphone of the electronic equipment are arranged on a same side of the electronic equipment, the first recess 125 and the second recess 127 are arranged on the protective fence 14 of the second bottom plate 121 to correspond to the speaker and the microphone, the curved retaining portion 15 of the second bottom plate 121 has a sound sending orifice 126 defined thereon to correspond to the first recess 125, and the curved retaining portion 15 of the second bottom plate 121 has a sound receiving orifice 128 defined thereon to correspond to the second recess 127, such that when the speaker makes sounds, the sounds are guided by the first recess 125 to send out of the sound sending orifice 126, thereby causing bass effect. Furthermore, when a user makes sounds, the sounds are sent to the microphone via the sound receiving orifice 128 and the second recess 127, thus gathering the sounds together.

Figure 8:
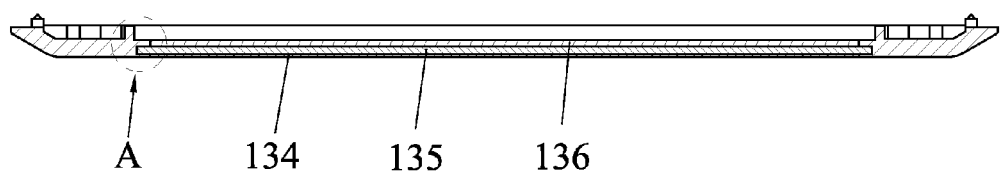
FIG. 8 is a cross sectional view of the assembly of a third bottom plate of the protective shell for the electronic equipment according to the preferred embodiment of the present invention.
Figure 9:
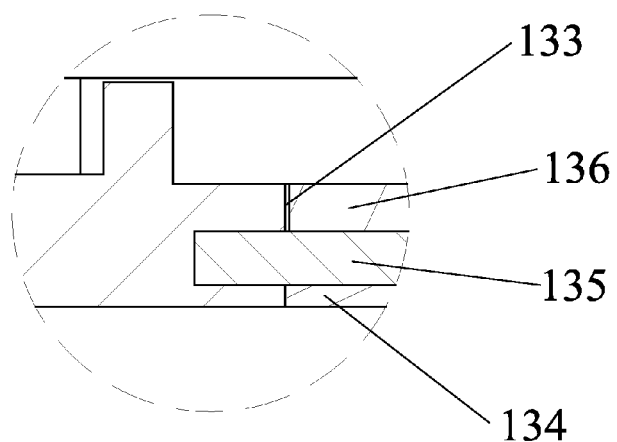
FIG. 9 is an amplified cross sectional of a portion A of FIG. 8.
Figure 10:
FIG. 10 is a cross sectional view of the exploded components of a heat dissipating piece of the protective shell for the electronic equipment according to the preferred embodiment of the present invention.
Figure 10:
Figure 10:

As shown in FIGS. 8 to 10, the protective shell 1 further comprises a heat dissipation structure. The heat dissipation structure includes a metal sheet 135 arranged on/in the third bottom plate 13 to correspond to the accommodating cavity 16, wherein the metal sheet 135 has a Nano-cooling layer 134 formed on a back surface thereof and has a heat dissipating piece 136 formed on a front surface thereof to contact with the second bottom plate 121.

Preferably, the third bottom plate 13 also has a cool groove 133 defined thereon, wherein the cool groove 133 passes through or does not pass through the third bottom plate 13, and the cool groove 133 has the metal sheet 135 arranged therein by retaining a peripheral side of the metal sheet 135 in the third bottom plate 13. The metal sheet 135 has the heat dissipating piece 136 formed on the front surface thereof and has the Nano-cooling layer 134 formed on the back surface thereof, wherein the heat dissipating piece 136 stacks on the metal sheet 135, and an area of the metal sheet 135 is larger than that of the heat dissipating piece 136, such that the heat is conducted to the metal sheet 135 and is dissipated quickly via the Nano-cooling layer 134. To enhance heat dissipation, the peripheral side of the metal sheet 135 fully extends toward the third bottom plate 13, i.e., increasing the area of the metal sheet 135 to enhance heat dissipation.

The Nano-cooling layer 134 is formed on the back surface of the metal sheet 135 and its size corresponds to a size of the cool groove 133, thus the heat is removed to air quickly from the electronic equipment via the Nano-cooling layer 134.

Preferably, the cool groove 133 has a stepped portion arranged around a peripheral side thereof to adhere with a peripheral side of the back surface of the metal sheet 135, and the Nano-cooling layer 134 is formed on the back surface of the metal sheet 135, the heat dissipating piece 136 is formed on the front surface of the metal sheet 135. In another embodiment, the stepped portion of the peripheral side of the cool groove 133 adheres with a peripheral side of the front surface of the metal sheet 135, the heat dissipating piece 136 is formed on the front surface of the metal sheet 135, and the Nano-cooling layer 134 is formed on the back surface of the metal sheet 135.

As illustrated in FIG. 10, the heat dissipating piece 136 has a conducting layer 1361, a carrying layer 1362, and a removing layer 1363, wherein the carrying layer 1362 has a first face and a second face opposite to the first face, and the conducting layer 1361 is coupled with the first face of the carrying layer 1362, the removing layer 1363 is joined with the second face of the carrying layer 1362 and the front surface of the metal sheet 135, such that the conducting layer 1361 contacts with the second bottom plate 121 to conduct heat into the carrying layer 1362, and then the carrying layer 1362 conducts heat toward the metal sheet 135 via the removing layer 1363.

Thereby, the protective shell 1 of the present invention dissipates heat to the air quickly so as to cool the electronic equipment efficiently.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A protective shell for electronic equipment comprising: a first casing and a second casing which are connected together to form an accommodating cavity for accommodating electronic equipment, wherein the first casing or the second casing is flexible to place electronic equipment in the accommodating cavity or to remove the electronic equipment from the accommodating cavity;

wherein the first casing has a first bottom plate, the second casing has a second bottom plate, a first end of the first bottom plate retains with a first end of the second bottom plate, and the first bottom plate has a protective fence arranged around a second end and two peripheral sides thereof, the second bottom plate has a protective fence formed around a second end and two peripheral sides thereof, wherein each protective fence of the first bottom plate and the second bottom plate has a curved retaining portion defined on a free end thereof, such that the first bottom plate, the second bottom plate, two protective fences of the first bottom plate and the second bottom plate, and two retaining portions of the first bottom plate and the second bottom plate form the accommodating cavity;

wherein the first casing further has a third bottom plate corresponding to the second bottom plate, and the third bottom plate is arranged on a back surface of the second bottom plate and retains with the first bottom plate, such that the first end of the first bottom plate is defined between the second bottom plate and the third bottom plate.

2. The protective shell for the electronic equipment as claimed in claim 1, wherein the first bottom plate has at least one orifice, and the second bottom plate and the third bottom plate have plural retaining protrusions for retaining with the at least one orifice of the first bottom plate.

3. The protective shell for the electronic equipment as claimed in claim 2, wherein the second bottom plate has plural first retaining protrusions and plural second retaining protrusions arranged thereon and corresponding to the at least one orifice, wherein each first retaining protrusion is spaced apart from each second retaining protrusion, the third bottom plate has a plurality of third retaining protrusions formed thereon and corresponding to the at least one orifice, wherein each third retaining protrusion is retained between each first retaining protrusion and each second retaining protrusion.

4. The protective shell for the electronic equipment as claimed in claim 1, wherein the first bottom plate has three-dimensional patterns formed on an upper surface thereof in the accommodating cavity.

5. The protective shell for the electronic equipment as claimed in claim 1 further comprising a wireless charging circuit board defined between the second bottom plate and the third bottom plate, wherein the wireless charging circuit board has an output segment arranged on the protective fence of the third bottom plate to correspond to a charging interface of the electronic equipment.

6. The protective shell for the electronic equipment as claimed in claim 5, wherein the output segment extends into the accommodating cavity, and when the electronic equipment is accommodated in the accommodating cavity, the output segment electrically connects with the charging interface of the electronic equipment.

7. The protective shell for the electronic equipment as claimed in claim 1, wherein the protective fence of the second bottom plate has an input interface arranged therein, electrically connected with the output segment, and electrically connecting with an external data cable.

8. The protective shell for the electronic equipment as claimed in claim 1, wherein the protective fence of the second bottom plate has a socket corresponding to a docking port of the electronic equipment.

9. The protective shell for the electronic equipment as claimed in claim 1, wherein the protective fence of the second bottom plate has and indicating unit, and the indicating unit includes a circuit board and at least one indicator coupled with the circuit board, wherein the at least one indicator is applied to indicate a connecting state of the electronic equipment and the external USB data cable or to indicate a charging state of the electronic equipment.

10. The protective shell for the electronic equipment as claimed in claim 9, wherein the indicator is an indication light or a LCD monitor.

11. The protective shell for the electronic equipment as claimed in claim 1, wherein the protective fence of the second bottom plate has a first recess defined thereon to correspond to a speaker of the electronic equipment, and the curved retaining portion of the second bottom plate has at least one sound sending orifice formed thereon to correspond to the first recess.

12. The protective shell for the electronic equipment as claimed in claim 1, wherein the protective fence of the second bottom plate further has a second recess arranged thereon to correspond to a microphone of the electronic equipment, and the curved retaining portion of the second bottom plate further has at least one sound receiving orifice defined thereon to correspond to the second recess.

13. The protective shell for the electronic equipment as claimed in claim 1, wherein the third bottom plate also has a metal sheet arranged thereon to correspond to the accommodating cavity, and the metal sheet has a Nano-cooling layer formed on a back surface thereof and has a heat dissipating piece formed on a front surface thereof to contact with the second bottom plate.

14. The protective shell for the electronic equipment as claimed in claim 13, wherein the third bottom plate also has a cool groove defined thereon, and the cool groove has the metal sheet arranged therein.

15. The protective shell for the electronic equipment as claimed in claim 13, wherein the heat dissipating piece has a conducting layer, a carrying layer, and a removing layer, wherein the carrying layer has a first face and a second face opposite to the first face, and the conducting layer is coupled with the first face of the carrying layer, the removing layer is joined with the second face of the carrying layer and the front surface of the metal sheet, such that the conducting layer contacts with the second bottom plate to conduct heat into the carrying layer, and then the carrying layer conducts the heat toward the metal sheet via the removing layer.

16. The protective shell for the electronic equipment as claimed in claim 1, wherein the first bottom plate also has a locking rib extending outwardly from the first end thereof and has the at least one orifice defined on the locking rib.

\* \* \* \* \*